Oct. 4, 1938.   J. J. RULIANCICH   2,132,221
POWER TRANSMISSION
Filed Sept. 14, 1937   3 Sheets-Sheet 2
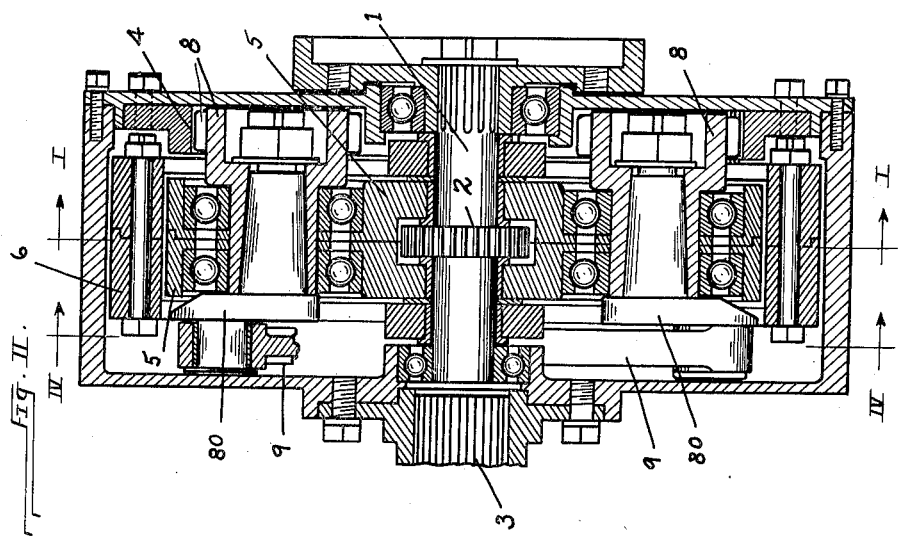
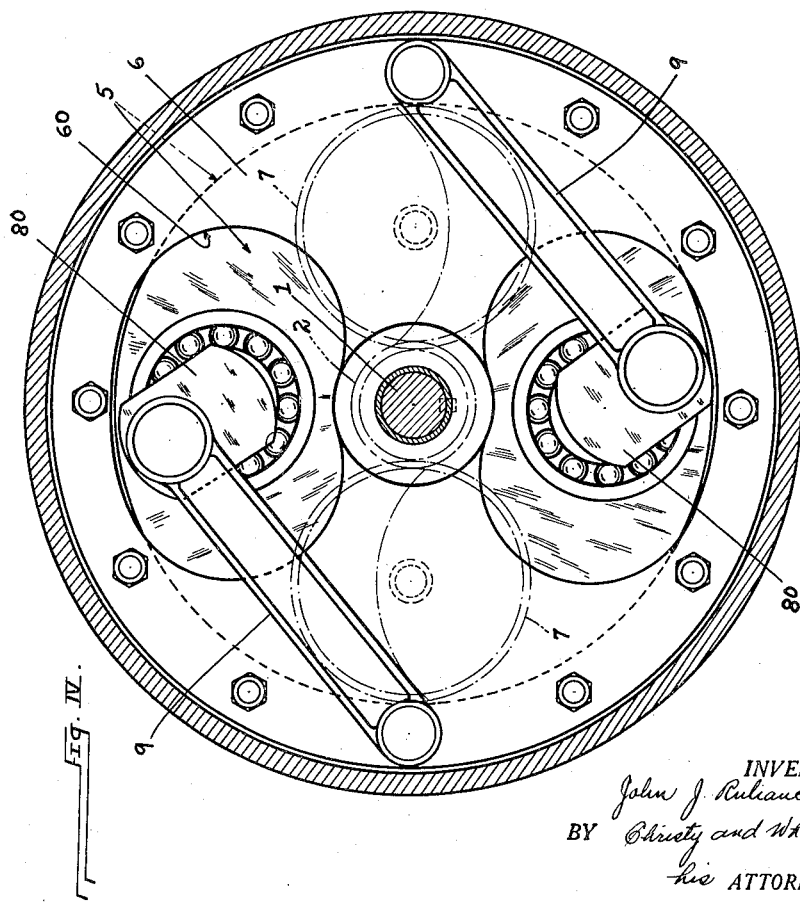
INVENTOR.
John J. Ruliancich
BY Christy and Wharton
his ATTORNEYS.

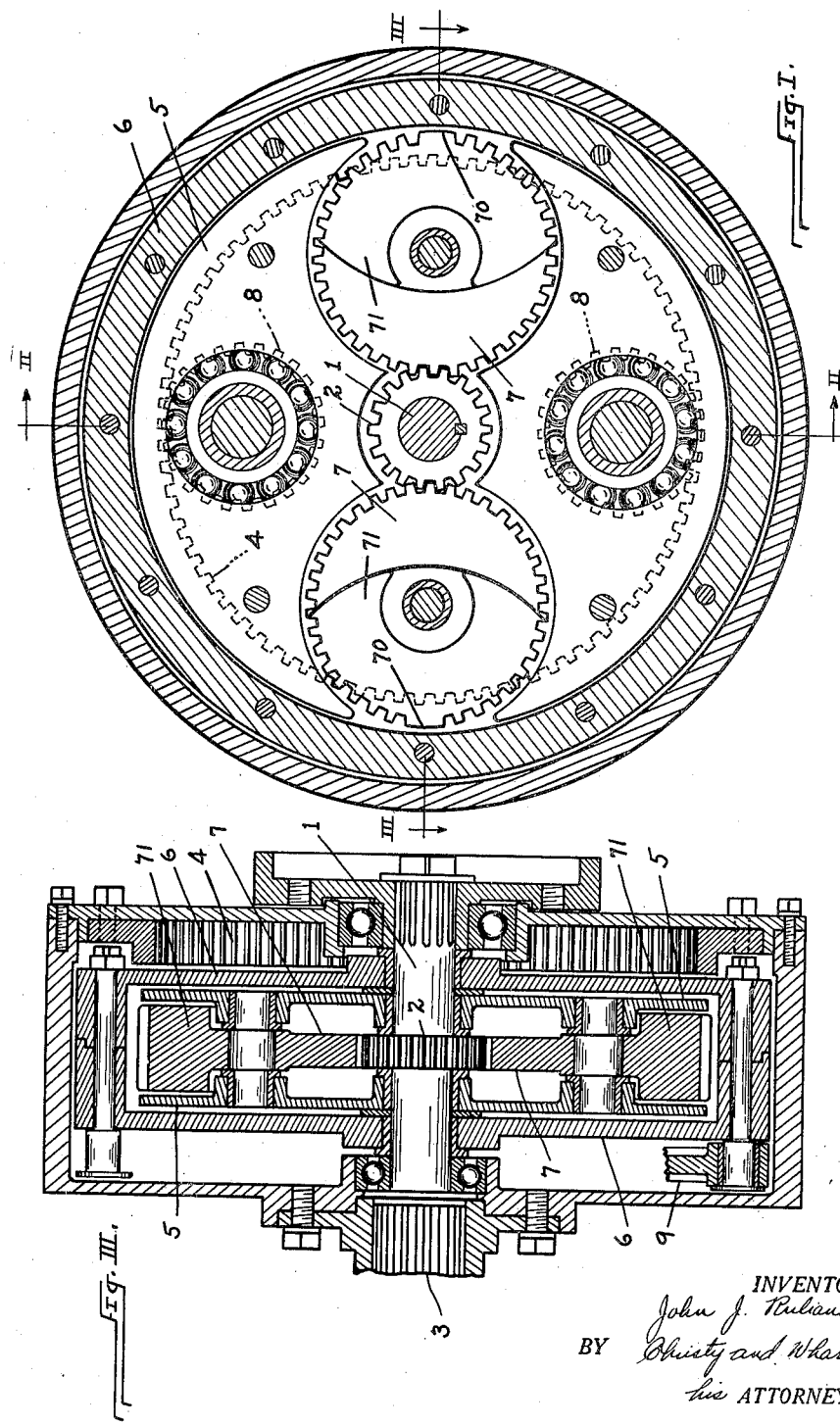

Oct. 4, 1938.    J. J. RULIANCICH    2,132,221
POWER TRANSMISSION
Filed Sept. 14, 1937    3 Sheets-Sheet 3
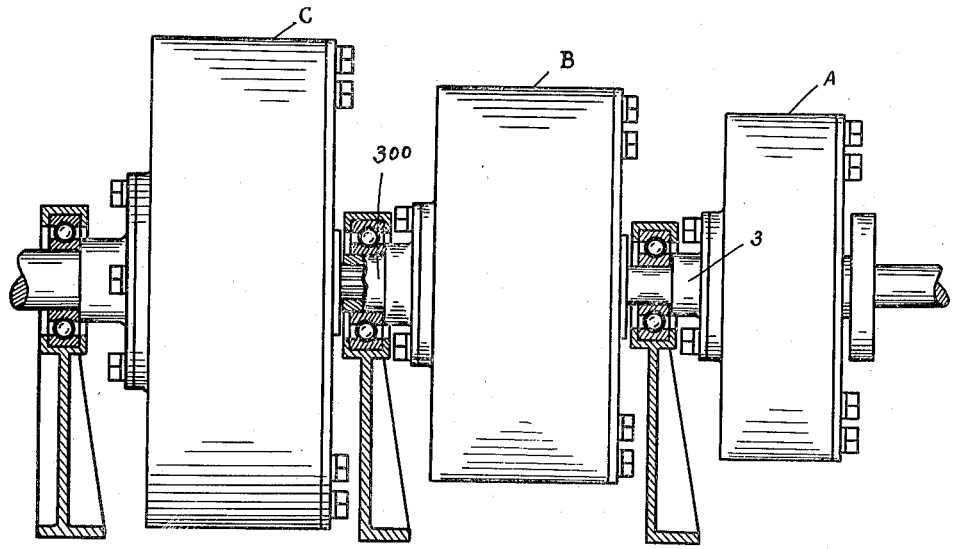
Fig. V.
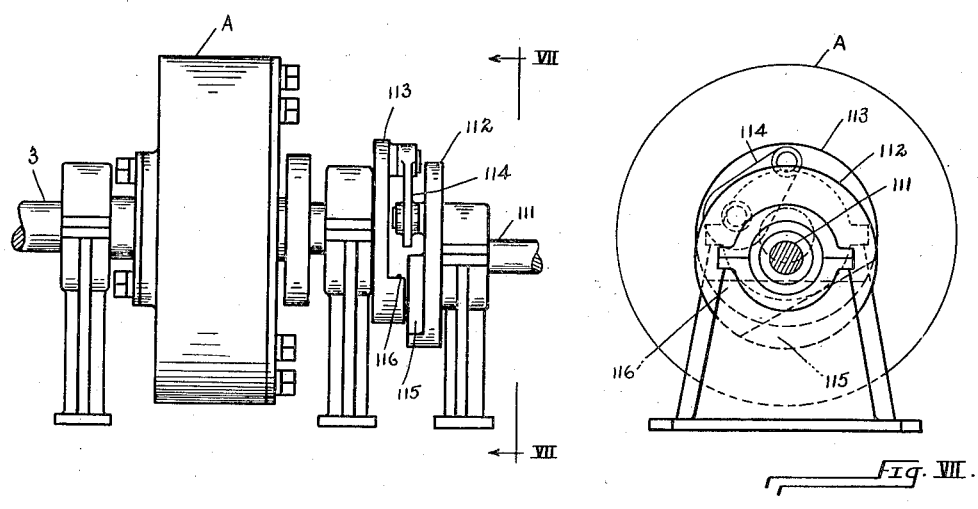
Fig. VI.    Fig. VII.
INVENTOR.
John J. Ruliancich
BY Christy and Wharton
his ATTORNEYS.

Patented Oct. 4, 1938

2,132,221

UNITED STATES PATENT OFFICE 2,132,221

POWER TRANSMISSION

John J. Ruliancich, New Kensington, Pa.

Application September 14, 1937, Serial No. 163,817

7 Claims. (Cl. 74—259)

This invention relates to power transmission, and consists in a gear-train so organized as to make automatic accommodation to variation in load, and from a constantly rotating drive shaft to effect rotation of a driven shaft at a rate that shall vary inversely as the resistance varies. It involves the enjoyment of the Coriolis acceleration.

In the accompanying drawings Figs. I and II are views in vertical section of a gear-train of my invention. The plane of section of Fig. I is indicated by the line I—I, Fig. II, and that of Fig. II is indicated at II—II, Fig. I. Fig. III is a view in horizontal section, on the plane indicated at III—III, Fig. I. Fig. IV is a view in section, on the plane IV—IV, Fig. II. Fig. V shows, partly in elevation, partly in axial section, an assembly of elements, each of which includes the structure in which the invention primarily consists, and an assembly that in itself contains a further feature of invention. Fig. VI is a view in elevation of an organization of the power-transmitting mechanism, in which my invention primarily consists, with a supplemental device, whereby the Coriolis acceleration may be made additionally effective. Fig. VII is a view in section, on the plane VII—VII, Fig. VI.

As shown in these drawings, 1 is a power shaft, which, as will be understood, is adapted to be positively and powerfully driven. This shaft carries integrally an exteriorly toothed gear-wheel, 2. A driven shaft 3 is mounted in axial alignment with the power shaft; and it carries integrally an interiorly toothed gear-wheel 4.

Idly mounted upon the shaft assembly, and conveniently upon power shaft 1, are two disks 5 and 6. The disk 5 carries rotatably mounted upon it two pairs of gear-wheels 7, 7 and 8, 8, the two wheels of each pair placed in diametrically opposite positions with respect to the axis of shaft turning, and the gears of the two pairs arranged at 90° spacing, as best shown in Fig. I. The gear-wheels 7, 7 are in mesh with the gear-wheel 2, and the gear-wheels 8, 8 are in mesh with the gear-wheel 4. The gear-wheels 7, 7 are incomplete, in that at one point in the perimeter of each the sequence of the teeth is interrupted by a blank and untoothed portion 70 of small circumferential extent, and the centers of gravity of the two gear-wheels 7 are removed from the center of rotation to points intermediate between the center and the untoothed portion 70 of the perimeter, by means of asymmetrical enlargements 71 of the mass.

The gear-wheels 8 are provided with integrally borne crank-arms 80, and connecting the crank-arms 80 with the disks 6 are links 9, pivoted at their ends to the two said members. The disk 6 is windowed at 60 to afford clearance for the link-and-crank connection specified, with a sufficient range of relative displacement (circumferential, with respect to the axis of shaft turning) between the disks 5 and 6 to permit of operation in the manner to be described.

Let it be assumed, first, that, the parts being at rest, the shaft 1 is set in rotation. Immediately the gear-wheels 7 will be turned through approximately half a rotation from the positions shown in Fig. I, and until the blank portions 70 shall have met the teeth of gear-wheel 2. The turning of gear-wheels 7 then will cease, and continued turning of shaft 1 will cause the disk 5 to turn in unison with the shaft. As soon as disk 5 begins to turn, the unbalanced gear-wheels 7, 7, subject to centrifugal force, will begin to rotate oppositely, and in so doing to effect reduction in the rate of rotation of disk 5 relatively to shaft 1. As the so oppositely rotating gear-wheels 7, 7 approach their initial positions, the torque of shaft 1, becoming increasingly effective, will overcome centrifugal force and cause the gear-wheels 7, 7, after coming gradually to rest, to begin to rotate again in the initial direction; and their rotation will continue until the increasing effect of centrifugal force brings them to rest and then causes them to turn in again reversed direction. Thus it will be seen that in operation disk 5 is subject to tendencies to retardation and acceleration in its rotation upon shaft 1, and gear-wheels 7, 7 are subject to tendencies to oscillatory rotation. These tendencies are governed by the crank-and-link connection between gear-wheels 8, 8 (borne by disk 5) and disk 6. Such connection, while permitting variation in the range of gear-wheel oscillation, establishes a movement of relative oscillation through a fixed range between disks 5 and 6.

Always, in any practical organization, there will be a load, a resistance to the turning of driven shaft 3. This resistance to turning expresses itself in a tendency of the gear-wheel 4 to effect rotation of the intermeshed gear-wheels 8, 8, and that tendency will be great or small, according as the load upon shaft 3 is great or small.

Rotation of power shaft 1 expresses itself in two rotations: the rotation of disk 5 upon shaft 1 and the rotation of gear-wheels 7, 7 upon disk 5. The reaction of the load expresses itself in a tendency of gear-wheels 8, 8 to rotate in retrogression in their mounting upon disk 5; but, since gear-wheels 8 are connected by link-and-crank with gear-wheels 7, 7, the tendency of gear-wheels 8, 8 to rotate is not freely effective, and the resistance of the load expresses itself in part in reduction in the speed of turning of the disk 5 upon shaft 1. The effect of the organization described is that, the range of oscillation of gear-wheels 7, 7 is great or small, as the load upon shaft 3 is light or heavy, and (the torque of shaft 1 being constant) the two movements, rotation of disk 5 upon shaft 1 and rotation of gear-wheels 8, 8 upon disk 5 make accommodation to variation in load and always the driven shaft turns, and turns at a speed (otherwise constant) that varies inversely as the load varies. The organization affords enjoyment of the Coriolis acceleration (see Introduction to Theoretical Physics, by Arthur Haas, Ph. D., tr. by T. Verschoyle, London, 2 ed. p. 45); see also General Mechanics by Max Planck, translated by Henry L. Brose, Macmillan & Co., London, 1933, section 61.

The structure of my invention has inherent capacity to absorb torsional vibration of the rotating parts. And if the power transmitting device of my invention, now described, be applied to an engine shaft (say the shaft of an internal combustion engine) as the drive shaft, it will be found, not only that a fly-wheel is unnecessary; but that, in the absence of a fly-wheel, the power will be effective in larger measure and in properly controlled transmission. The pulsation in the rotation of the shaft enhances the effect of Coriolis acceleration, and torsional vibration is absorbed.

In Fig. V illustration is afforded of the cumulation of power-transmitting devices of my invention. Here are shown, for example, three such devices, A, B, and C. The driven shaft 3 of device A becomes the drive shaft of device B, and the driven shaft 300 of device B becomes the drive shaft of device C. By such means the Coriolis acceleration may be made cumulatively effective.

It will be found advantageous to impart to the shaft that I have in the foregoing portion of the specification termed the drive shaft a pulsating rotation, for by such pulsation the effect of Coriolis acceleration will be more pronounced. This is illustrated in Figs. VI and VII. In this case a shaft 111 may be understood to be constantly and powerfully rotating shaft. It carries rigidly a disk 112. Arranged adjacent to the shaft 111 and in parallelism with but out of axial line with shaft 111 is the drive shaft of the power-transmitting device A already described. This drive shaft of the power transmitting device carries rigidly, in addition to the parts already described, a disk 113. The two disks 112 and 113 stand adjacent one another; and they are connected by a link 114 that is pivoted at its ends to the two disks and at points remote from the centers of disk turning. Through such connection rotation of shaft 111 at relatively constant rate imparts to the drive shaft of the power-transmitting device A a rotation that is a relatively pulsating one. And by such provision, as I have said, the Coriolis impulse will be rendered additionally effective in the rotation of the driven shaft 3. The disks 112 and 113 are counter-weighted, as shown at 115 and 116.

I claim as my invention:

1. In a power-transmitting device, a drive shaft and a driven shaft, each equipped with a rigidly borne gear-wheel, a disk idly mounted in axial alignment with the drive shaft, two gear-wheels rotatably mounted on said disk on axes of rotation parallel with and spatially remote from the axis of the drive shaft, one of said gear-wheels being asymmetrical in mass distribution and being in mesh with the gear-wheel borne by the drive shaft, and the other of said disk-borne gear-wheels being in mesh with the gear-wheel with which the driven shaft is equipped, a second disk idly mounted in axial alignment with the drive shaft, and means for effecting relative oscillation between the two said disks through a constant range and in synchronism with rotation upon its axis of the said gear-wheel of asymmetrical mass distribution.

2. In a power-transmitting device, a drive shaft and a driven shaft assembled in axial alignment, each equipped with a rigidly borne gear-wheel, a disk idly mounted on the assembly of aligned shafts, two gear-wheels rotatably mounted on said disk on axes of rotation parallel with and spatially remote from the shaft axis, one of said gear-wheels, asymmetrical in mass distribution, being in mesh with the gear-wheel borne by the drive shaft, and the other of said disk-borne gear-wheels being in mesh with the gear-wheel borne by the driven shaft, a second disk idly mounted on the shaft assembly, and crank-and-link connection between the second of said disk-borne gear-wheels and said second disk.

3. In a power-transmitting device, a drive shaft and a driven shaft assembled in axial alignment, each equipped with a rigidly borne gear-wheel, a disk idly mounted on the assembly of aligned shafts, two gear-wheels rotatably mounted on said disk on axes of rotation parallel with and spatially remote from the shaft axis, one of said gear-wheels, asymmetrical in mass distribution, being in mesh with the gear-wheel borne by the drive shaft, and the other of said disk-borne gear-wheels being in mesh with the gear-wheel borne by the driven shaft, a second disk idly mounted on the shaft assembly, and means for effecting relative oscillation between the two said disks through a range that is constant and in synchronism with rotation upon its axis of the gear-wheel of asymmetrical mass distribution.

4. In a power-transmitting device, a drive shaft and a driven shaft assembled in axial alignment, each equipped with a rigidly borne gear-wheel, a disk idly mounted on the assembly of aligned shafts, two gear-wheels rotatably mounted on said disk on axes of rotation parallel with and spatially remote from the shaft axis, one of said gear-wheels being asymmetrical in mass distribution and having an interruption in the continuity of the succession of its teeth, and being in mesh with the gear-wheel borne by the drive shaft, and the other of said disk-borne gear-wheels being in mesh with the gear-wheel borne by the driven shaft, a second disk idly mounted on the shaft assembly, and means for effecting relative oscillation between the two said disks through a constant range and in synchronism with rotation upon its axis of the gear-wheel of asymmetrical mass distribution.

5. In a power-transmitting device, a drive shaft, and an axially aligned driven shaft, a gear-wheel rigidly borne by the drive shaft, a disk idly mounted on the assembly of aligned shafts, a pair of gear-wheels assembled in diametrically opposed positions and rotatably mounted on the disk and having mass-distribution such that the center of gravity is remote from the center of rotation, said gear-wheels being in mesh with the gear-wheel first named, and means for transmitting power, with Coriolis acceleration, from the said pair of gear-wheels to the driven shaft, such means including a gear-wheel borne by the driven shaft and a pair of gear-wheels intermeshing therewith and borne by the said disk and in diametrically opposed positions thereon, together with a second disk idly mounted on the shaft assembly, and means for effecting relative oscillation between the two disks through a constant range and in synchronism with the rotation upon their axes of the gear-wheels of eccentric mass distribution.

6. In power transmitting apparatus a power shaft, a shaft arranged on an axis parallel to but spatially remote from that of the power shaft, means for imparting to the second shaft a relatively pulsating rotation in response to the relatively constant rotation of the power shaft, in combination with the power-transmitting mechanism defined in claim 5, the second shaft mentioned above being the drive shaft of such mechanism.

7. In a power-transmitting device, a drive shaft and a driven shaft assembled in axial alignment, a torque-transmitting member idly mounted on the shaft assembly and rotatable on the axis of such assembly, means interconnecting said drive shaft and the torque-transmitting member, said means including a gear concentric with respect to the shaft axis in mesh with an unbalanced gear rotatable on an axis eccentric with respect to the shaft axis, and means interconnecting said idly mounted torque-transmitting member with said driven shaft, said last means including two gears in mesh, one rotatable on an axis of rotation concentric with respect to the shaft axis and the other rotatable on an axis of rotation eccentric with respect to the shaft axis, and a second member idly mounted on the shaft axis, and a crank-and-link connection between such second member and the last-mentioned eccentric gear.

JOHN J. RULIANCICH.